(12) United States Patent
Varney

(10) Patent No.: US 9,151,609 B2
(45) Date of Patent: *Oct. 6, 2015

(54) FOOTER SQUARE APPARATUSES

(71) Applicant: Curtis Randy Varney, Greeneville, TN (US)

(72) Inventor: Curtis Randy Varney, Greeneville, TN (US)

(*) Notice: Subject to any disclaimer, the term of this patent is extended or adjusted under 35 U.S.C. 154(b) by 178 days.

This patent is subject to a terminal disclaimer.

(21) Appl. No.: 13/784,050

(22) Filed: Mar. 4, 2013

(65) Prior Publication Data

US 2013/0263460 A1    Oct. 10, 2013

Related U.S. Application Data

(63) Continuation of application No. 13/439,017, filed on Apr. 4, 2012, now Pat. No. 8,887,406.

(51) Int. Cl.
*G01C 15/12* (2006.01)
*B25H 7/02* (2006.01)
*G01B 3/56* (2006.01)

(52) U.S. Cl.
CPC .......... *G01C 15/12* (2013.01); *B25H 7/02* (2013.01); *G01B 3/566* (2013.01)

(58) Field of Classification Search
CPC ........... G01B 3/566; G01C 15/12; B25H 7/02
USPC ................................................. 33/405, 429
See application file for complete search history.

(56) References Cited

U.S. PATENT DOCUMENTS

| | | | |
|---|---|---|---|
| 299,625 A | 6/1884 | Covell | |
| 661,483 A | 11/1900 | Barrie | |
| 868,421 A | 10/1907 | Feil | |
| 1,327,198 A | 1/1920 | Carlson | |
| 1,368,857 A * | 2/1921 | Stevens | 33/1 R |
| 1,401,200 A | 12/1921 | Smith | |
| 1,897,682 A | 2/1933 | Souders | |
| 2,586,074 A * | 2/1952 | Memluck | 33/1 LE |
| RE24,044 E * | 7/1955 | Breuninger | 33/405 |
| 2,758,380 A * | 8/1956 | Harris | 33/1 N |
| 2,872,733 A * | 2/1959 | Chew | 33/1 LE |
| 3,061,931 A | 11/1962 | Di Stefano | |
| 4,999,922 A | 3/1991 | Loggins | |
| 5,107,595 A | 4/1992 | Stay et al. | |
| 5,118,184 A | 6/1992 | Kordana | |
| 5,119,565 A * | 6/1992 | Horvath et al. | 33/405 |
| 5,170,568 A * | 12/1992 | Wright | 33/480 |
| 5,727,325 A * | 3/1998 | Mussell | 33/429 |
| 6,122,834 A | 9/2000 | Rester | |
| 6,327,786 B1 | 12/2001 | Felix | |
| 6,868,616 B2 * | 3/2005 | Allemand | 33/476 |
| 6,978,553 B2 | 12/2005 | Doublet | |
| 7,398,601 B2 * | 7/2008 | Morrell | 33/429 |
| 8,887,406 B2 * | 11/2014 | Varney | 33/405 |
| 2008/0256810 A1 * | 10/2008 | Akihary | 33/1 N |
| 2012/0246952 A1 * | 10/2012 | Varney | 33/413 |
| 2013/0269197 A1 * | 10/2013 | Collins | 33/405 |

* cited by examiner

*Primary Examiner* — Christopher Fulton
(74) *Attorney, Agent, or Firm* — Dinsmore & Shohl LLP; Monika L'Orsa Jaensson, Esq.

(57) ABSTRACT

A footer square apparatus may be used to measuring a building foundation and may include a footer square body, a first guide line, a second guide line, a third guide line, a corner marking, and at least one angle marking. The first guide line and second guide line may be perpendicular, and the third guide line may form a 45° angle with the first guide line and second guide line. The at least one angle marking may identify an angle as measured between a line from the corner marking to the angle marking and at least one of the first guide line, the second guide line, and the third guide line.

20 Claims, 7 Drawing Sheets

US 9,151,609 B2

FOOTER SQUARE APPARATUSES

REFERENCE TO RELATED APPLICATIONS

The present application claims priority to U.S. Provisional Application 61/471,382, filed Apr. 4, 2011, titled FOOTER SQUARE, which is incorporated herein by reference, and also claims priority to U.S. Non-Provisional application Ser. No. 13/439,017, titled FOOTER SQUARE APPARATUSES, filed Apr. 4, 2012, now U.S. Pat. No. 8,887,406, issued Nov. 18, 2014, which is incorporated herein by reference.

TECHNICAL FIELD

Embodiments provided herein generally relate to construction, and more specifically to equipment and methods for measuring a foundation of a structure.

BACKGROUND

Measuring the foundation of a structure, wherein a construction surface is marked at the perimeter of the foundation of a structure, is a necessary step in many construction projects. For example, a construction project may require the corners of a rectangular foundation of a structure be visually marked, such as with posts. However, measuring foundations of structures can be a difficult and time consuming process.

Special tools may be required to precisely mark the position where a structure is to be built. However, some of these tools may not give users any concrete and discernable indication of being completely square or rectangular with 90° angles on all sides, or other needed angles, requiring users to determine the proper position simply by their visual perception. This method may cause inaccuracies and thus, flaws in the resulting structure.

Accordingly, a need exists for a device and process to efficiently mark a foundation of a structure.

SUMMARY

In one embodiment, a footer square apparatus may comprise a footer square body, a first guide line, a second guide line, a third guide line, a corner marking, and at least one angle marking. The first guide line may be disposed on the footer square body and have a length that is substantially straight. The second guide line may be disposed on the footer square body and have a length that is substantially straight. The length of the first guide line may be substantially perpendicular to the length of the second guide line. The third guide line may be disposed on the footer square body and have a length that is substantially straight. The length of the third guide line may form a 45° angle with the first guide line and may form a 45° angle with the second guide line. At least one angle marking may be disposed on the footer square body. The at least one angle marking may identify an angle as measured between a line from the corner marking to the angle marking and at least one of the first guide line, the second guide line, and the third guide line.

In another embodiment, a footer square apparatus may comprise a footer square body, a first guide line, a second guide line, and a stabilizing edge. The first guide line may be disposed on the footer square body and have a length that is substantially straight. The second guide line may be disposed on the footer square body and have a length that is substantially straight. The length of the first guide line may be substantially perpendicular to the length of the second guide line. The stabilizing edge may comprise a substantially flat surface on an edge of the footer square body, wherein the first guide line is normal to the substantially flat surface and the second guide line is parallel to the substantially flat surface.

In yet another embodiment, a footer square apparatus may comprise a footer square body, a first guide line, a second guide line, a third guide line, a stabilizing edge, a corner marking, and at least one angle marking. The first guide line may be disposed on the footer square body and have a length that is substantially straight. The second guide line may be disposed on the footer square body and have a length that is substantially straight. The length of the first guide line may be substantially perpendicular to the length of the second guide line. The third guide line may be disposed on the footer square body and have a length that is substantially straight. The length of the third guide line may form a 45° angle with the first guide line and may form a 45° angle with the second guide line. At least one angle marking may be disposed on the footer square body. The at least one angle marking may identify an angle as measured between a line from the corner marking to the angle marking and at least one of the first guide line, the second guide line, and the third guide line. The stabilizing edge may comprise a substantially flat surface on an edge of the footer square body, wherein the first guide line is normal to the substantially flat surface and the second guide line is parallel to the substantially flat surface.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

In one embodiment, a footer square apparatus for measuring a foundation of a structure may generally comprise a footer square body, a first guide line, a second guide line, and a post receiving opening disposed through the footer square body. Generally, to operate the footer square apparatus the footer square apparatus may be mounted onto a post and one or more string segments may be aligned with the first guide line and second guide line respectively to measure a right angle for a foundation of a structure. In another embodiment, The footer square apparatus may additionally comprise at least one angle marking that identifies an angle relative to the first guide line or second guide line, or both, such as to enable a user to measure angles that are not 90°. In another embodiment, the footer square apparatus may comprise a stabilizing edge, wherein the stabilizing edge may generally comprise a substantially flat surface on an edge of the footer square body that allows a user to stabilize the footer square apparatus when held against a wall.

Figure 1:
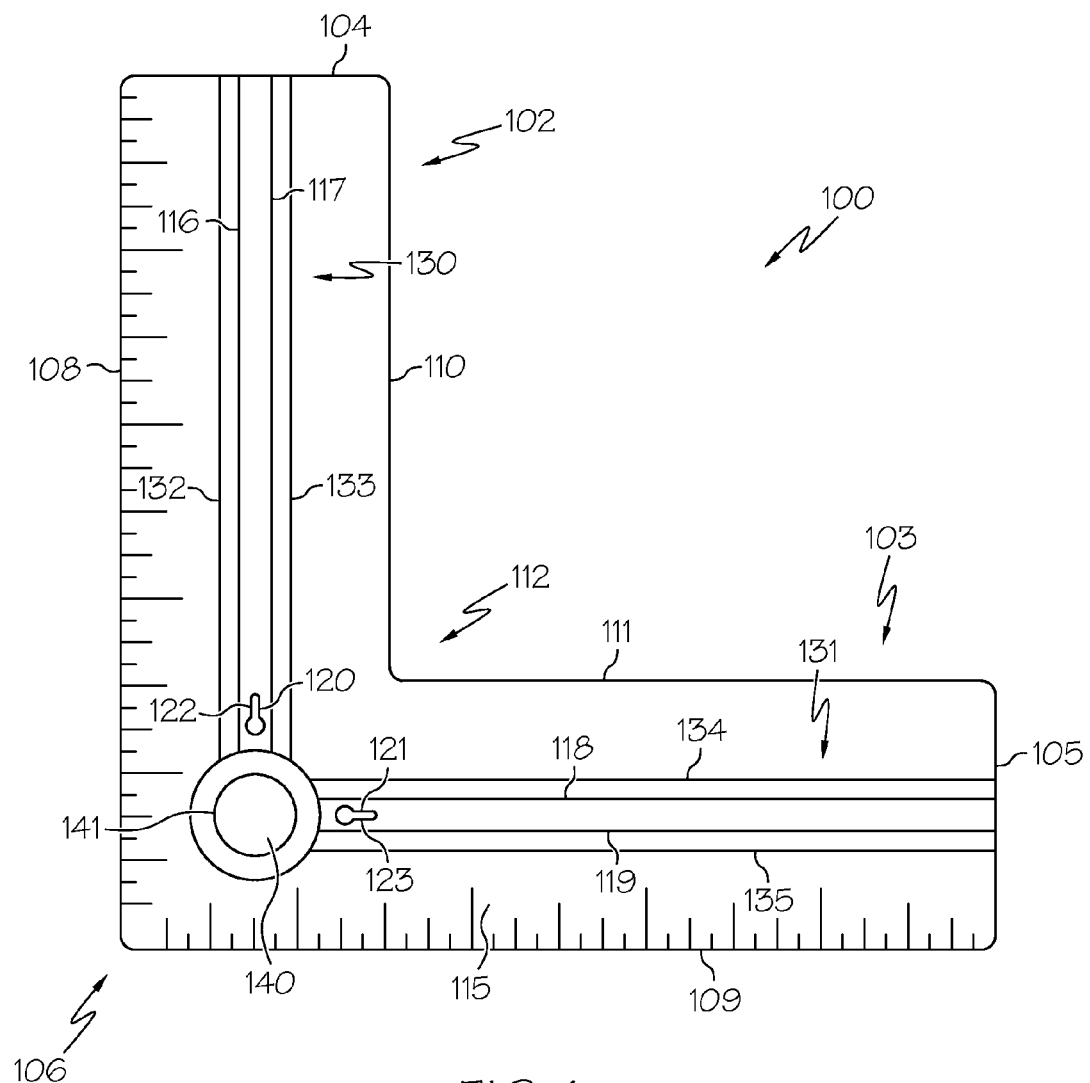
FIG. 1 schematically depicts a top view of a footer square apparatus according to one or more embodiments shown and described herein.
Figure 2:
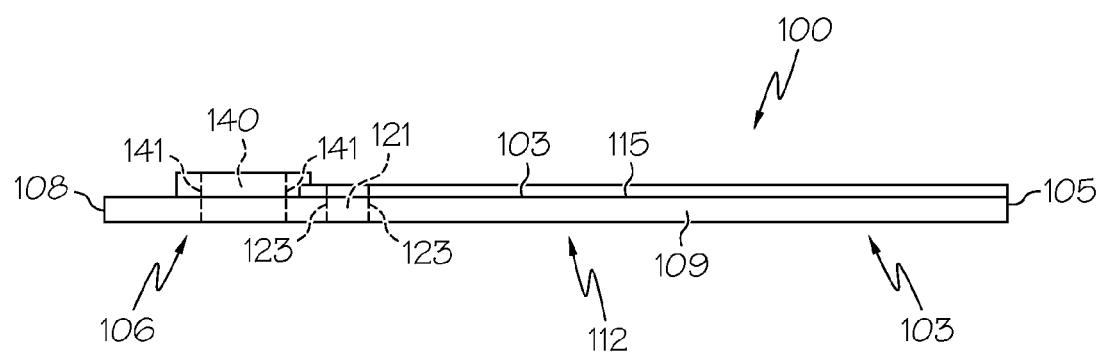
FIG. 2 schematically depicts a side view of a footer square apparatus according to one or more embodiments shown and described herein.
Figure 3:
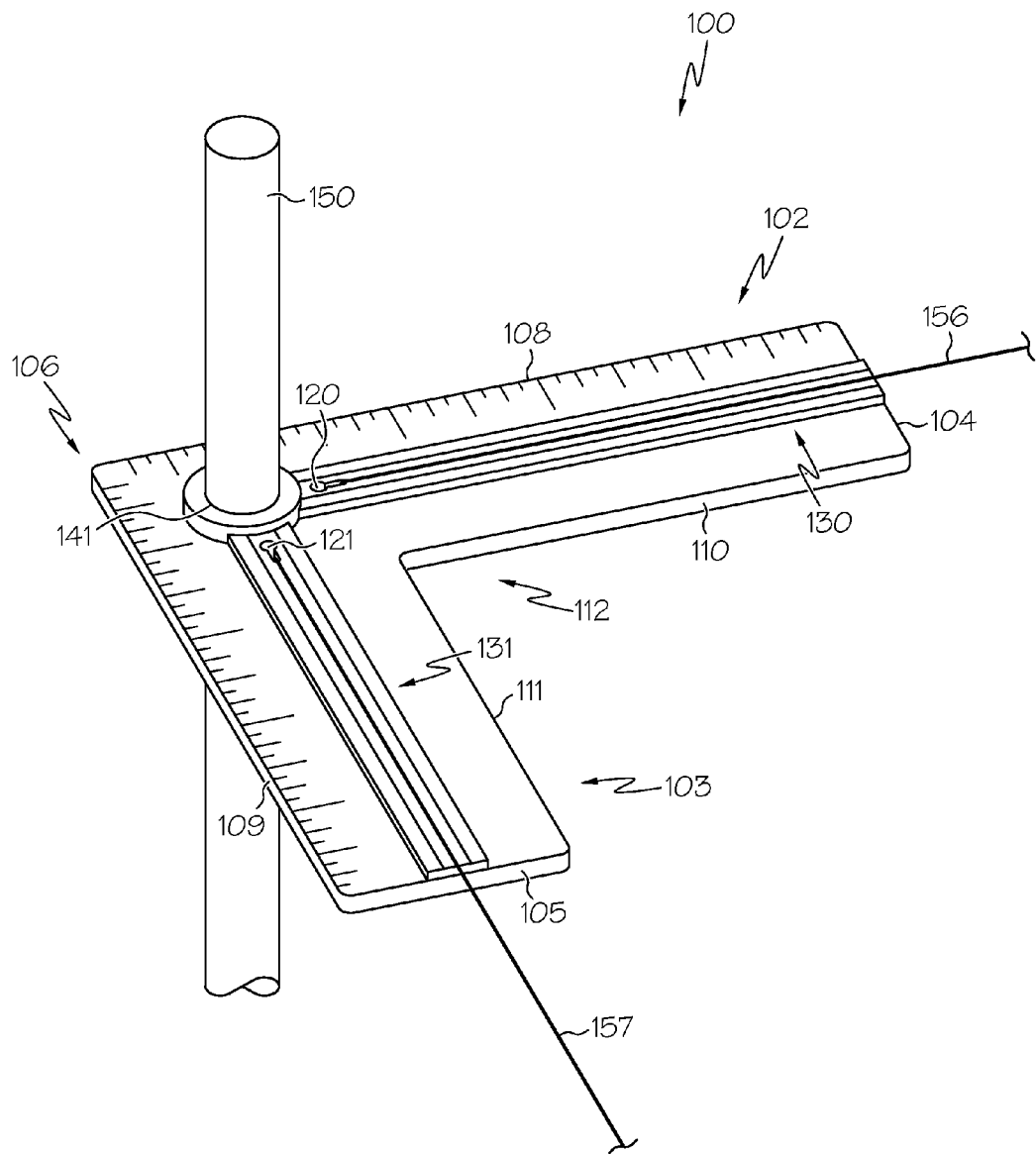
FIG. 3 schematically depicts a footer square apparatus mounted on a post according to one or more embodiments shown and described herein.

Referring now to FIGS. 1-3, an embodiment of a footer square apparatus 100 is schematically depicted. The footer square apparatus 100 comprises a footer square body 112 that may be a rigid material that provides the structure of the footer square apparatus 100. The footer square body 112 may comprise rigid materials such as, but not limited to, molded plastic, wood, metallic material, or combinations thereof. In one embodiment, the footer square body 112 may be "L-shaped" with a first leg 102 and a second leg 103 emanating from a central region 106. The first leg 102 and the second leg 103 may both protrude from a central region 106 of the footer square body 112 at about a right angle relative to each other. The first leg 102 may be defined by a first leg end 104, a first leg outer edge 108, and a first leg inner edge 110. The first leg outer edge 108 may define the length of the first leg 102 as measured by the distance between the first leg end 104 and the second leg outer edge 109. Similarly, the second leg 103 may be defined by a second leg end 105, a second leg outer edge 109, and a second leg inner edge 111. The second leg outer edge 109 may define the length of the second leg 103 as measured by the distance between the second leg end 105 and the first leg outer edge 108.

In one embodiment, the first leg 102 and second leg 103 may have lengths of between about 2 inches and about 2 feet. In another embodiment, the first leg 102 and second leg 103 may have lengths of between about 3 inches and about 12 inches. In one embodiment, the first leg 102 and the second leg 103 have lengths of about 5 inches. It should be understood that the first leg 102 and second leg 103 need not have equal lengths. The footer square body 112 has a height defined by the first leg end 104, second leg end 105, first leg outer edge 108, first leg inner edge 110, second leg outer edge 109, and second leg inner edge 111, as shown in the vertical direction in FIG. 2. The height of the footer square body 112 may be substantially less than the length of the first leg 102 and the second leg 103.

Referring still to FIGS. 1-3, the footer square apparatus 100 has at least a first guide line 130 and second guide line 131. The first guide line 130 and second guide line 131 may each be disposed on a top surface 115 of the footer square body 112. The first guide line 130 and second guide line 131 may be printed onto the footer square body 112 in a color different from the color of the footer square body 112 or may be indicated by a raised, textured, or otherwise contoured surface of the footer square body 112. For example, the first guide line 130 and second guide line 131 may be a raised area of the footer square body 112 on the top surface 115. In one embodiment, the first guide line 130 is disposed along the length of the first leg 102, and the second guide line 131 is disposed along the length of the second leg 103.

The first guide line 130 and second guide line 131 may be substantially straight respectively. However, the first guide line 130 and second guide line 131 need not be entirely straight lines. The first guide line 130 and second guide line 131 may be any pattern or design which allows a user to align a string that is held straight with the first guide line 130 or second guide line 131. For example, the first guide line 130 or second guide line 131 could be a pattern of shapes that are aligned in a straight line. The guide line may even be a single marking, for example a marking on the first or second leg 103, which allows for a string to be properly aligned. It should be understood that a guide line as used herein need not have the physical features of a geometric line, but may be any collection of points or a pattern that allow a string to be aligned at a desired angle, such as two points.

In some embodiments, the first guide line 130 or second guide line 131 may comprise a collection of markings. In one embodiment, the first guide line 130 comprises two inner guide line markings 116,117 and two outer guide line markings 132,133, such that the inner guide line markings 116,117 are parallel lines that are parallel to the outer guide line markings 132,133. Similarly, the second guide line 131 may comprise two inner guide line markings 118,119 and two outer guide line markings 134,135, such that the inner guide line markings 118,119 are parallel lines that are parallel to the outer guide line markings 134,135. For example, the first guide line 130 may comprise a set of parallel lines as guide line markings 116, 117, 132, 133. Similarly, the second guide line 131 may comprise a set of parallel lines as guide line markings 118, 119, 134, 135. In one embodiment, the outer guide line markings 132, 133, 134, 135 are raised areas on the top surface 115 of the footer square body 112. The inner guide line markings 116, 117, 118, 119 may be contoured lines that are disposed on the raised area defined by the outer guide line markings 132, 133, 134, 135. However, it should be understood that in some embodiments, a collection of lines need not be disposed on the footer square body 112, as a small marking or straight line may function as a first guide line 130 or second guide line 131. Additionally, in some embodiments, more than one set of outer line markers may be disposed on the footer square body 112 to form the first guide line 130 or second guide line 131.

The first guide line 130 may be perpendicular to the second guide line 131, such that a right angle is formed by the first guide line 130 and second guide line 131. In other embodiments, the first guide line 130 and second guide line 131 may be at other angles with respect to one another.

The footer square body 112 may comprise a post receiving opening 141 that is disposed through the footer square body 112. The post receiving opening 141 may be located at the intersection of the first guide line 130 and the second guide line 131. The post receiving opening 141 can receive a post 150, such that the post 150 can be inserted through the post receiving opening 141, as shown in FIG. 3. Alternatively, in some embodiments, the post receiving opening 141 may allow the footer square apparatus 100 to be mounted on a post 150 without the post 150 passing completely through the post receiving opening 141. The post receiving opening 141 may have a circular cross section, such as a circular shape that is sized to complement a substantially cylindrical shaped post 150. However, it should be understood that the shape and size of the cross section of the post receiving opening 141 may be any size and shape such as to complement the size and shape of a given post 150.

In one embodiment, the post receiving opening 141 is positioned at the intersection of the first guide line 130 and second guide line 131. The first guide line 130 and second guide line 131 may emanate from the post receiving opening 141 and project at a right angle.

The footer square body 112 of the footer square apparatus 100 may comprise one or more string receiving openings 120,121 that pass through the footer square body 112 and are defined by string receiving opening walls 122,123. A first string receiving opening 120 may be disposed on the first guide line 130 and allow a string or other wire to pass through the footer square body 112. The first string receiving opening 120 may be positioned on the first guide line 130. Similarly, the second string receiving opening 121 may be positioned on the second guide line 131. The first string receiving opening 120 and the second string receiving opening 121 may be of any shape such that a string can be secured at the string receiving opening 122,123 and maintain a stationary position at the first string receiving opening 120 and second string receiving opening 121. For example, a string segment 156, 157 could pass through a string receiving opening 120,121, be knotted on the underside of the footer square body 112 and be pulled taut on the top side of the footer square body 112.

Now referring to FIG. 3, the footer square apparatus 100 may be used to measure a building foundation. Generally, to operate the footer square apparatus 100, the footer square body 112 may be mounted to a post 150 and a first string segment 156 is aligned with the first guide line 130 and a second string segments 157 is aligned with the second guide line 131.

The post 150 may be inserted into the construction surface, such that the length of the post 150 is substantially vertical. The post 150 is inserted into the construction surface at a corner of a rectangular foundation of a building or other structure. In one embodiment, the footer square body 112 is positioned on the post 150 at a distance above the construction surface, wherein the post 150 is disposed through the post receiving opening 141. For example, the footer square apparatus 100 can be positioned at about 6 inches, about 12 inches, about 24 inches, or even about 5 feet above the construction surface.

A first string segment 156 may be positioned through the first string receiving opening 120 and a second string segment 157 may be positioned through the second string receiving opening 121. The first string segment 156 is aligned with the first guide line 130 and the second string segment 157 is aligned with the second guide line 131, such that the first string segment 156 is substantially parallel to the first guide line 130 and the second string segment 157 is substantially parallel to the second guide line 131. The first string segment 156 and the second string segment 157 may be arranged such that the first string segment 156 and second string segment 157 are at a 90° angle, and such that the first string segment 156 and second string segment 157 lie on a horizontal plane. It should be understood that the string may be any suitable type of string such as a woven fabric string, rope, wire, twine, plastic string, or combinations thereof.

Still referring to FIG. 3, in another embodiment, the first string segment 156 and second string segment 157 are two separate strings. The first string segment 156 may be passed through the first string receiving opening 120 and knotted on the footer square underside, such that the first string segment 156 is held stationary at the first string receiving opening 120 when aligned with the first guide line 130 and pulled taut. Similarly, the second string segment 157 may be passed through the second string receiving opening 121 and knotted on the footer square underside, such that the second string segment 157 is held stationary at the second string receiving opening 121 when aligned with the second guide line 131 and pulled taut. In another embodiment, the first string segment 156 and second string segment 157 are a single string. For example, the string may be positioned such that the string is above the footer square body 112 at the first sting segment, is passed through the first string receiving opening 120 to the underside of the footer square body 112, is passed through the second string receiving opening 121 to the topside of the footer square body 112 at the second string segment 157.

In another embodiment, the first string segment 156 and second string segment 157 may be attached to the post 150. For example, the first sting segment and the second string segment 157 may be tied to the post 150, and pulled taut in alignment with the first guide line 130 and second guide line 131 respectively.

To measure a rectangular foundation, the post 150 may be inserted at a corner of the structure foundation. The first string segment 156 may be pulled taut and aligned with the first guide line 130 and the second string segment 157 may be pulled taut and aligned with the second guide line 131. The first string segment 156 and second string segment 157 are used as a guide for measuring a right angle and to affix a second and third marker, such as additional posts, into the construction surface at the other corners of the structure. The footer square apparatus 100 may be used on a different corner post, and the process can be repeated until a rectangular building foundation is measured, or additional corner posts can be positioned based on measurements relative to the previously positioned corner posts. Additional measuring tools, such as a ruler or other length measuring devices, may be used to measure the distance of the corners marked by posts or other markers.

It should be understood that the footer square apparatus 100 can be positioned above the construction surface when affixed to the post 150, allowing the string to be pulled taut on a horizontal plane and not contact the construction surface. This feature allows for effective measurement of rectangle for a building foundation on uneven construction surfaces, such as hill or other downgrade.

Figure 4:
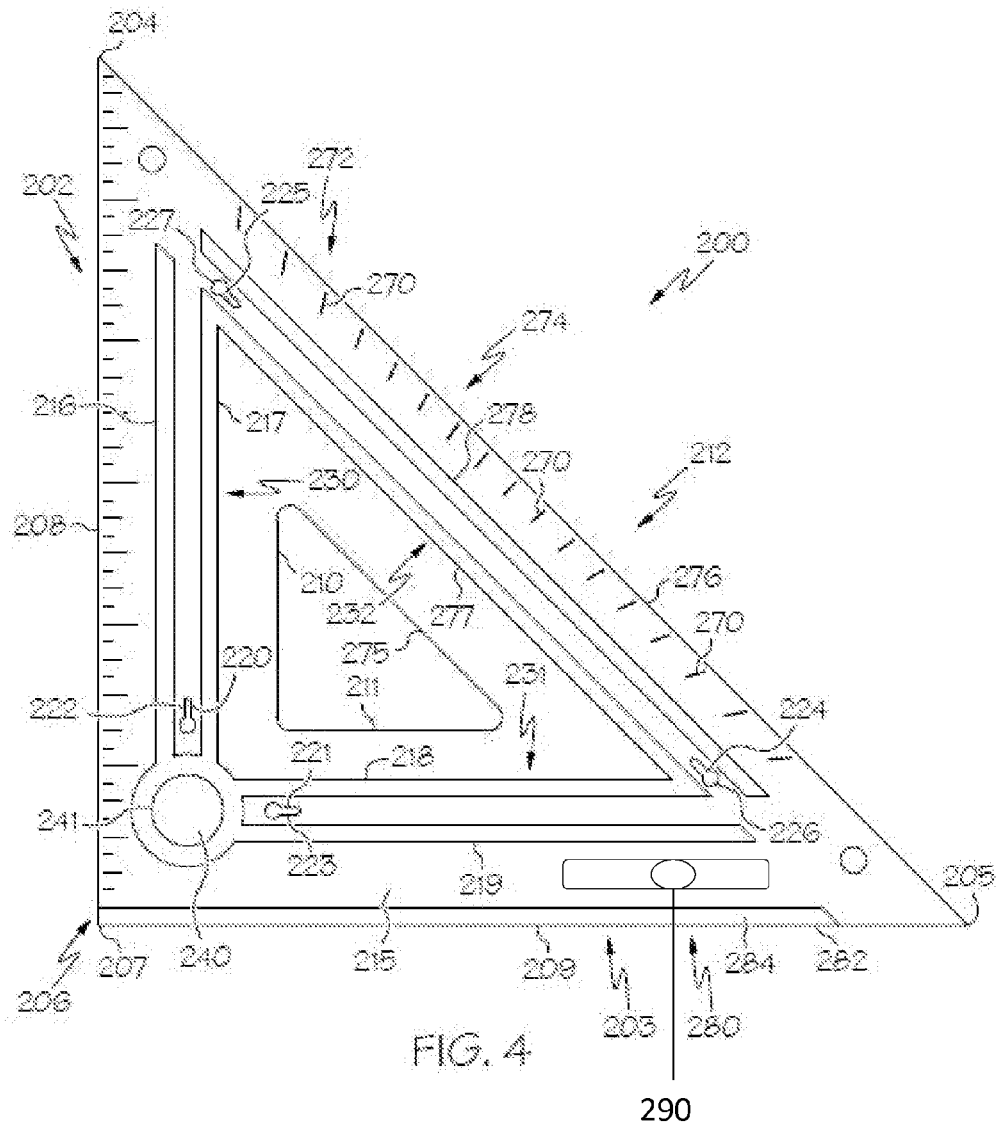
FIG. 4 schematically depicts a top view of a footer square apparatus comprising angle markings and a stabilizing edge according to one or more embodiments shown and described herein.
Figure 5:
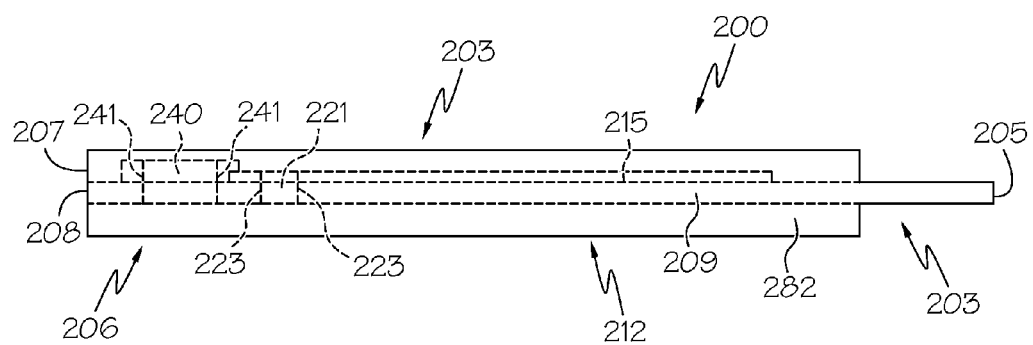
FIG. 5 schematically depicts a side view of a footer square apparatus comprising angle markings and a stabilizing edge according to one or more embodiments shown and described herein.
Figure 6:
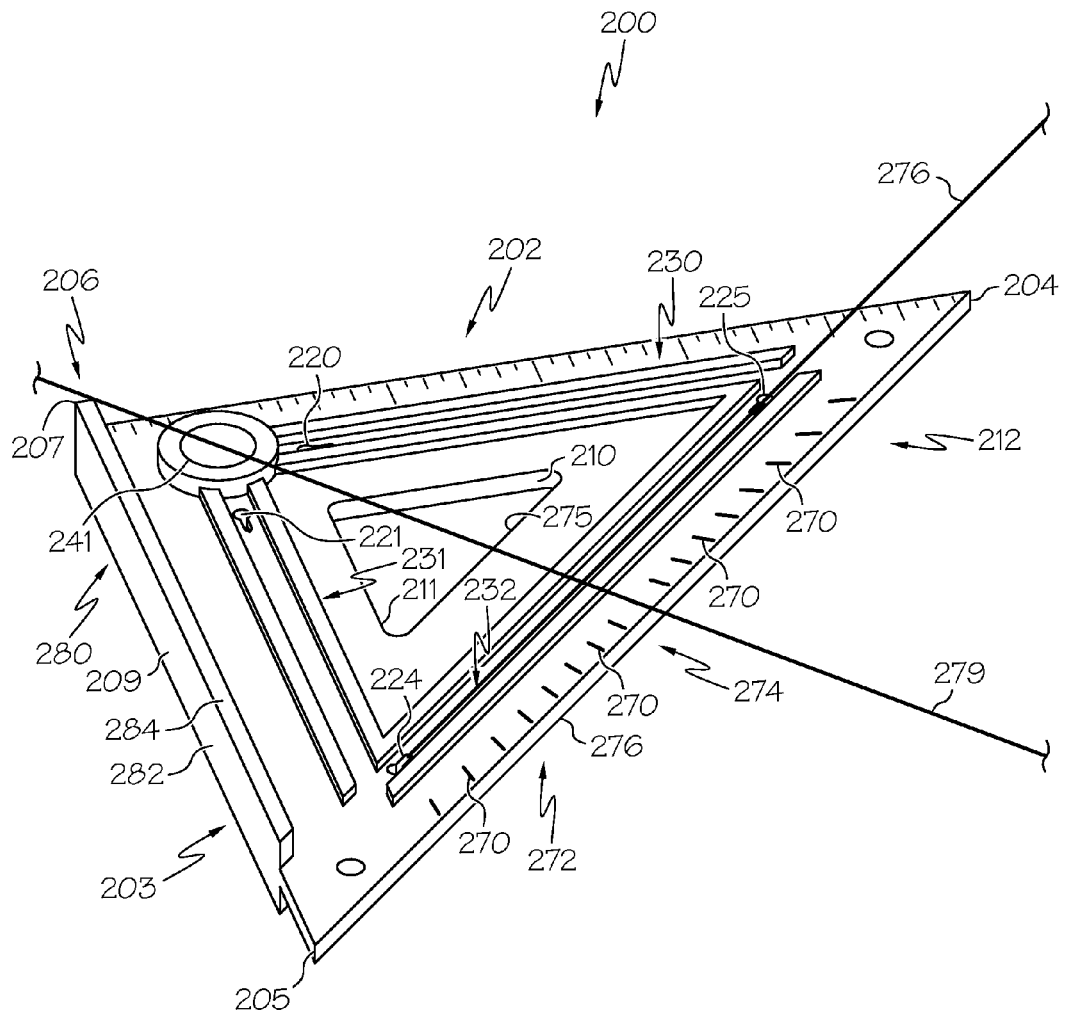
FIG. 6 schematically depicts a footer square apparatus comprising angle markings and a stabilizing edge in a hand held configuration.

Referring now to FIGS. 4-6, in another embodiment, the footer square apparatus 200 may optionally comprise at least one angle marking 270 and/or optionally comprise a stabilizing edge 280. The footer square apparatus 200 comprises a footer square body 212 that may be a rigid material that provides the structure of the footer square apparatus 200. The footer square body 212 may comprise rigid materials such as, but not limited to, molded plastic, wood, metallic material, or combinations thereof. In one embodiment, the footer square body 212 may comprise a first leg 202 and a second leg 203 emanating from a central region 206. The first leg 202 and the second leg 203 may both protrude from a central region 206 of the footer square body 212 at about a right angle relative to one other. The first leg 202 may be defined by a first leg end 204, a first leg outer edge 208, and a first leg inner edge 210. The first leg outer edge 208 may define the length of the first leg 202 as measured by the distance between the first leg end 204 and the second leg outer edge 209. Similarly, the second leg 203 may be defined by a second leg end 205, a second leg outer edge 209, and a second leg inner edge 211. The second leg outer edge 209 may define the length of the second leg 203 as measured by the distance between the second leg end 205 and the first leg outer edge 208.

In one embodiment, the first leg 202 and second leg 203 may have lengths of between about 2 inches and about 2 feet. In another embodiment, the first leg 202 and second leg 203 may have lengths of between about 3 inches and about 12 inches. In one embodiment, the first leg 202 and the second leg 203 have lengths of about 5 inches. It should be understood that the first leg 202 and second leg 203 need not have equal lengths. The footer square body 212 has a height defined by the first leg end 204, second leg end 205, first leg outer edge 208, first leg inner edge 210, second leg outer edge 209, and second leg inner edge 211, as shown in the vertical direction in FIG. 5. The height of the footer square body 212 may be substantially less than the length of the first leg 202 and the second leg 203.

Referring still to FIGS. 4-6, the footer square apparatus 200 may have at least a first guide line 230 and second guide line 231. The first guide line 230 and second guide line 231 may each be disposed on a top surface 215 of the footer square body 212. The first guide line 230 and second guide line 231 may be printed onto the footer square body 212 in a color different from the color of the footer square body 212 or may be indicated by a raised, textured, or otherwise contoured surface of the footer square body 212. For example, the first guide line 230 and second guide line 231 may be a raised area of the footer square body 212 on the top surface 215. In one embodiment, the first guide line 230 is disposed along the length of the first leg 202, and the second guide line 231 is disposed along the length of the second leg 203.

The first guide line 230 and second guide line 231 may be substantially straight, respectively. However, the first guide line 230 and second guide line 231 need not be entirely straight lines. The first guide line 230 and second guide line 231 may be any pattern or design which allows a user to align a string that is held straight with the first guide line 230 or second guide line 231. For example, the first guide line 230 or second guide line 231 could be a pattern of shapes that are aligned in a straight line. The guide line may even be a single marking, for example a marking on the first or second leg 203, which allows for a string to be properly aligned. It should be understood that a guide line as used herein need not have the physical features of a geometric line, but may be any collection of points or a pattern that allow a string to be aligned at a desired angle, such as two points.

In some embodiments, the first guide line 230 or second guide line 231 may comprise a collection of markings. In the embodiment shown in FIGS. 4-6, the first guide line 230 comprises two raised guide line markings 216,217, such that the guide line markings 216,217 are parallel lines. Similarly, the second guide line 231 may comprise two raised guide line markings 218,219, such that the guide line markings 218,219 are parallel. In one embodiment, the guide line markings 216, 217, 218, 219 are raised areas on the top surface 215 of the footer square body 212. However, it should be understood that in some embodiments, a collection of lines need not be disposed on the footer square body 212, as a small marking or straight line may function as a first guide line 230 or second guide line 231. Additionally, in some embodiments, more than one set of outer line markers may be disposed on the footer square body 212 to form the first guide line 230 or second guide line 231.

The first guide line 230 may be perpendicular to the second guide line 231, such that a right angle is formed by the first guide line 230 and second guide line 231. In some embodiments, a post receiving opening 241 is disposed through the footer square body 212 and can receive a post (not shown in FIGS. 4-6). Alternatively, in some embodiments, the post receiving opening 241 may allow the footer square apparatus 200 to be mounted on a post without the post passing completely through the post receiving opening 241. The post receiving opening 241 may have a circular cross section, such as a circular shape that is sized to complement a substantially cylindrical shaped post. However, it should be understood that the shape and size of the cross section of the post receiving opening 241 may be any size and shape such as to complement the size and shape of a given post.

In one embodiment, the post receiving opening 241 is positioned at the intersection of the first guide line 230 and second guide line 231 (as shown in FIGS. 4-7). The first guide line 230 and second guide line 231 may emanate from the post receiving opening 241 and project at a right angle.

Figure 7:
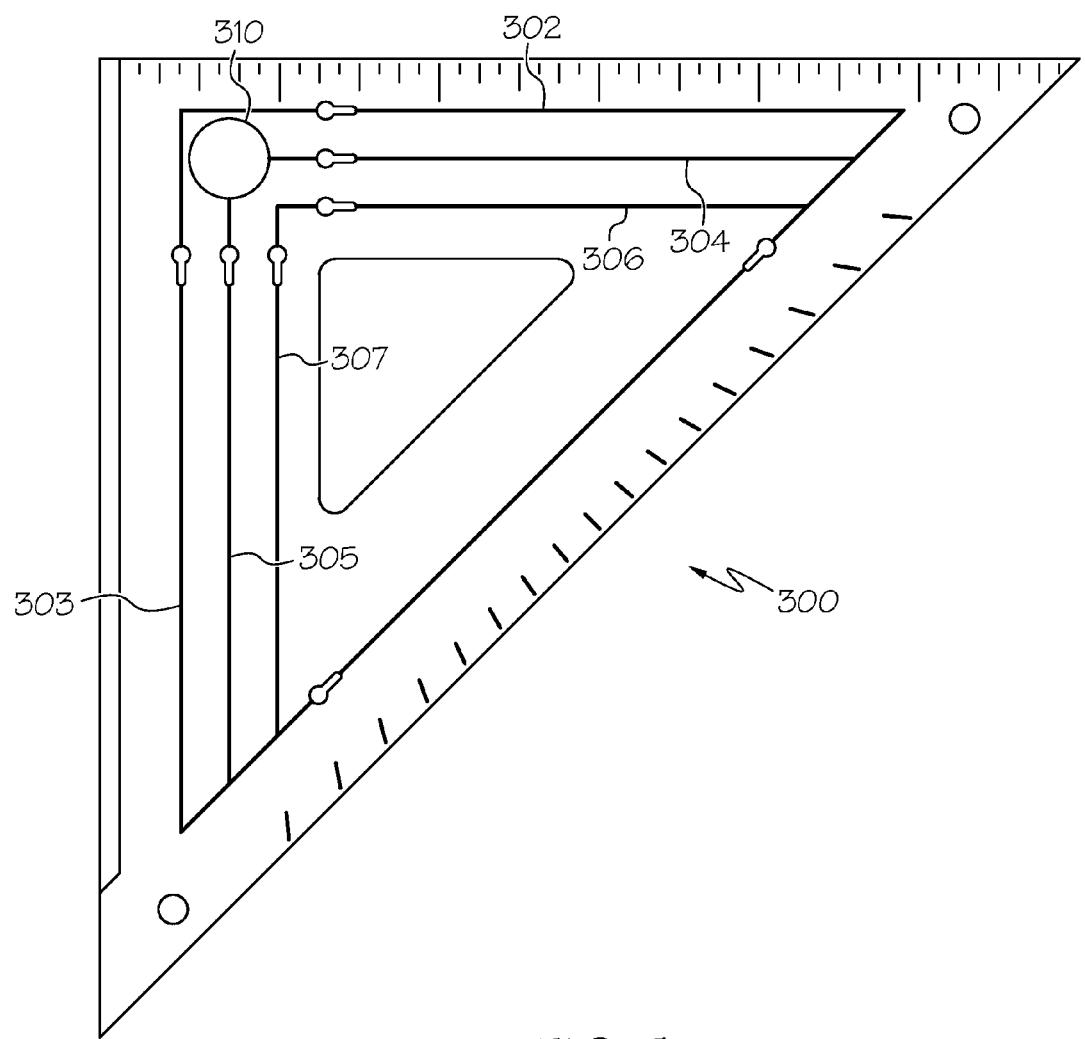
FIG. 7 schematically depicts a footer square apparatus according to one or more embodiments shown and described herein.

Now referring to FIG. 7, in another embodiment, the post receiving opening 310 of a footer square apparatus 300 may not be positioned at the intersection of the first guide line and second guide line. For example, a set of guide lines 302,303 may intersect outside of the post receiving opening 310 or a set of guide lines 306,307 may intersect inside of the post receiving opening 310. The footer square apparatus 300 may comprise more than one set of guide lines, such as shown in FIG. 7. For example, FIG. 7 shows three sets of guide lines, with a first set 302,303 and second set 306,306 not intersecting the post receiving opening 310 and a third set 304,305 intersecting at the post receiving opening 310.

Referring again to FIGS. 4-6, the footer square body 212 of the footer square apparatus 200 may comprise one or more string receiving openings 220,221 that pass through the footer square body 212 and are defined by string receiving opening walls 222,223. A first string receiving opening 220 may be disposed on the first guide line 230 and allow a string or other wire to pass through the footer square body 212. The first string receiving opening 220 may be positioned on the first guide line 230. Similarly, the second string receiving opening 221 may be positioned on the second guide line 231. The first string receiving opening 220 and the second string receiving opening 221 may be of any shape such that a string can be secured at the string receiving opening walls 222,223 and maintain a stationary position at the first string receiving opening 220 and second string receiving opening 221. For example, a string segment (not shown in FIGS. 4-6) could pass through a string receiving opening 220,221, be knotted on the underside of the footer square body 212 and be pulled taut on the top side of the footer square body 212.

In one embodiment, the footer square body 212 comprises a connection arm 272 that is in contact with the first leg 202 and the second leg 203. If the first leg 202 and the second leg 203 are substantially perpendicular, then the connection arm 272 may form a hypotenuse of a right triangle shape formed by the footer square body 212. However, it should be understood that the footer square body 212 may be any shape.

In some embodiments, the footer square apparatus 200 may comprise a third guide line 232. The third guide line 232 may be disposed on the connection arm 272. In some embodiments, the third guideline 232 may form a 45° angle with the first guide line 230 and the second guide line 231.

The third guide line 232 may be a substantially straight line. However, the third guide line 232 need not be an entirely straight line. The third guide line 232 may be any pattern or design which allows a user to align a string that is held straight with the third guide line 232. For example, the third guide line 232 could be a pattern of shapes that are aligned in a straight line. The third guide line 232 may even be a pair of marking, for example a markings near the first leg 202 and second leg 203, which allows for a string to be properly aligned. It should be understood that a guide line as used herein need not have the physical features of a geometric line, but may be any collection of points or a pattern that allow a string to be aligned at a desired angle, such as two points.

In some embodiments, the third guide line 232 may comprise a collection of markings. In the embodiment shown in FIGS. 4-6, the third guide line 232 comprises two raised guide line markings 277, 278, such that the guide line markings 277,278 are parallel lines. In one embodiment, the guide line markings 277,278 are raised areas on the top surface 215 of the footer square body 212. However, it should be understood that in some embodiments, a collection of lines need not be disposed on the footer square body 212, as a small marking or straight line may function as a third guide line 232. Additionally, in some embodiments, more than one set of outer line markers may be disposed on the footer square body 212 to form the third guide line 232.

The footer square body 212 of the footer square apparatus 200 may comprise one or more string receiving openings 224,225 that pass through the footer square body 212 on the third guide line 232 and are defined by string receiving opening walls 226,227. For example, a third string receiving opening 224 may be disposed on the third guide line 232 and allow a string or other wire to pass through the footer square body 212. Similarly, a fourth string receiving opening 225 may be disposed on the third guide line 232 and allow a string or other wire to pass through the footer square body 212. The third string receiving opening 224 and the fourth string receiving opening 225 may be of any shape such that a string can be secured at the string receiving opening 224,225 and maintain a stationary position at the third string receiving opening 224 and/or fourth string receiving opening 225. For example, now referring to FIG. 6, a string segment 276 could pass through the third string receiving opening 224, be knotted on the underside of the footer square body 212 and be pulled taut on the top side of the footer square body 212.

Still referring to FIGS. 4-6, in one embodiment, the footer square apparatus 200 comprises at least one angle marking 270, and may comprise a plurality of angle markings 270. The angle markings 270 may be disposed on the connection arm 272. The footer square apparatus 200 may further comprise a corner marking 207. The corner marking 207 may be located at the corner of the footer square body, such that the angle markings 270 are arranged to show angles relative to its position. In another embodiment, the corner marking 207 is at the post receiving opening 241. However, the corner marking 207 may be located and visually identified at any position on the footer square body 212 such that the angle markings 270 are arranged to show angles relative to its position.

Each angle marking 270 identifies an angle as measured between a line from the corner marking 207 to the angle marking 270 and at least one of the first guide line 230, the second guide line 231, and the third guide line 232. Similar to the first guide line 230 and second guide line 231, each angle marking 270 may be signified by any means, including paint, a raised or textured or contoured surface, etc. In one embodiment, each angle marking 270 in the plurality of angle markings 272 identify an angle of between 0° and 90° relative to the first guide line 230 and/or second guide line 231. For example, the angles of between 0° and 90° may be identified by an angle marking 270 where every 15° is identified, such that 15°, 30°, 45°, 60°, and 75° each have an angle marking 270. In another embodiment, every 10°, 5° or 1° is marked. The angle measurement (i.e. the numeric measurement) may be signified on the body 212 by any means, such as a printed number. In other embodiments, such as when the first guide line 230 and second guide line 231 do not form a right angle, the angle markings 270 may identify angles outside of the range of 0° to 90°. In another embodiment, the markings may designate two sets of angles between 0° and 45° where 0° is at or near the center of the connection arm 272.

In one embodiment, as shown in FIG. 6, the footer square apparatus can be used in a "hand held" manner to measure a foundation. However, the footer square apparatus need to be actually held in a hand in all embodiments. The footer square apparatus 200 can be positioned such that a stationary string 279 crosses an angle marking 270 and the corner marking 207. For example, a stationary string 279 could be a foundation marker tied off at two posts. The string 276 can be positioned along the third guide line 232 so that it projects beyond the footer square apparatus. For example, the string 276 may be tied into a string receiving openings 224. By rotating the footer square apparatus 200 relative to the stationary string 276 while maintaining the string 276 in alignment with the third guide line 232, an angle relative to the stationary string 279 can be measures and signaled by string segment 276. The angle markings 270 allow for any desired angle to be measured relative to stationary string 279 in this manner. The user rotates the footer square apparatus 200 and string 276 relative to stationary string 279 while maintaining the position of the stationary string 279 at the corner marking 207, thus selecting a desired angle between the strings 276, 279 as signified by an angle marking 270.

In another embodiment, as shown in FIGS. 4-6, the footer square body 212 may comprise a stabilizing edge 280. The stabilizing edge 280 may comprise a substantially flat surface 282 on an edge of the footer square body 212, with a width 284 which may provide mechanical stability. The stabilizing edge 280 may be located on the second leg outer edge 209. The first guide line 230 may be normal to the substantially flat surface 282 and the second guide line 231 may be parallel to the substantially flat surface 282. In other embodiments, the stabilizing edge may be located on the first leg outer edge 208, such that the second guide line 231 may be normal to the substantially flat surface and the first guide line 230 may be parallel to the substantially flat surface. The substantially flat surface 282 may comprise a surface area sufficiently large enough to rotationally stabilize the footer square apparatus when contacted with and pressed against a flat wall at the substantially flat surface. For example, the stabilizing edge 280 may allow for user hold the footer square apparatus 200 against a wall and not allow rotational motion, especially vertical rotation, of the footer square apparatus 200 relative to the section of the footer square apparatus 200 touching the wall. For example, the embodiment of the footer square apparatus 100, shown in FIG. 1-3, may be thin and allow for rotational stability when the second leg outer edge 109 is held in contact with a wall.

In another embodiment, the footer square apparatus 100, 200 may further comprise a leveling device 290 that can detect if the first guide line and second guide line are parallel with a construction surface. The leveling device 290 may be any device capable of measuring the angular positioning of the footer square apparatus as compared with the ground or other construction surface. For example, two "bubble" levels can be used that are aligned with the first guide line and second guide line, respectively, such that they register as level when the first or second guide line is parallel with the ground. In such a configuration, the first and second guide lines can be positioned parallel to the construction surface.

In one embodiment, the footer square apparatus 200 of FIGS. 4-6 may be used similarly to the footer square apparatus 100 of FIGS. 1-3, as described herein. However, there may be additional benefits to a footer square apparatus 200 which comprises a stabilizing edge 280, angle markings 270, or both. To utilize the stabilizing edge 280 feature, a user puts the substantially flat surface 282 of the stabilizing edge in contact with a wall. The sufficiently large surface area of the substantially flat surface does not allow a rotational motion of the footer square apparatus 200 while the substantially flat surface 282 is in contact with a substantially flat wall.

It should be appreciated that features of the various embodiments of the footer square apparatus described herein are only representative, and may be used in any combination. For example, a footer square may comprise angle markings but not comprise a stabilizing edge, or vice versa. All possible combinations of the identified features of the footer square apparatus are contemplated herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

I claim:

1. A footer square apparatus for squaring a building foundation, the footer square apparatus comprising:
   a footer square body;
   a first guide line disposed on the footer square body and having a length that is substantially straight;
   a second guide line disposed on the footer square body and having a length that is substantially straight, wherein the length of the first guide line is substantially perpendicular to the length of the second guide line;
   a third guide line disposed on the footer square body and having a length that is substantially straight, wherein the length of the third guide line forms a 45° angle with the first guide line and forms a 45° angle with the second guideline;
   at least one string receiving opening positioned on said first guide line, said second guide line, said third guideline, or any combination thereof;
   a corner marking; and
   at least one angle marking disposed on the footer square body, wherein the at least one angle marking identifies an angle as measured between a line from the corner marking to the angle marking and at least one of the first guide line, the second guide line, and the third guide line.

2. The footer square apparatus of claim 1, wherein the footer square body comprises a first leg, a second leg, and a connection arm in contact with the first leg and the second leg, wherein the first guide line is disposed on the first leg, the second guide line is disposed on the second leg, the angle marking is disposed on the connection arm, and the third guide line is disposed on the connection arm.

3. The footer square apparatus of claim 1, wherein the footer square apparatus comprises a plurality of angle markings.

4. The footer square apparatus of claim 1, wherein the plurality of angle markings identify angles of between 0° and 90° relative to the first guide line.

5. The footer square apparatus of claim 1, wherein the first guide line, the second guide line, the third guide line, and the at least one angle marking are represented on the footer square body by a contoured surface or colored markings on the footer square body.

6. The footer square apparatus of claim 1, further comprising a leveling device that can detect if the first guide line and second guide line are parallel with a construction surface.

7. The footer square apparatus of claim 1, wherein said at least one string receiving opening comprises:
   a first string receiving opening disposed through the footer square body and on the first guide line; and
   a second string receiving opening disposed through the footer square body and on the second guide line.

8. The footer square apparatus of claim 1, wherein said at least one string receiving opening is disposed through the footer square body and on the third guideline.

9. The footer square apparatus of claim 8, wherein a second string receiving opening is disposed through the footer square body and on the third guideline.

10. The footer square apparatus of claim 1, wherein the first guide line and second guide line do not intersect at a post receiving opening.

11. The footer square apparatus of claim 1, wherein the corner marking is located at an edge of the footer square body.

12. A footer square apparatus for squaring a building foundation, the footer square apparatus comprising:
   a footer square body;
   a first guide line disposed on the footer square body and having a length that is substantially straight;
   a second guide line disposed on the footer square body and having a length that is substantially straight, wherein the length of the first guide line is substantially perpendicular to the length of the second guide line; and
   at least one string receiving opening positioned on said first guide line, said second guide line, or any combination thereof;
   a stabilizing edge comprising a substantially flat surface on an edge of the footer square body, wherein the first guide line is normal to the substantially flat surface and the second guide line is parallel to the substantially flat surface.

13. The footer square apparatus of claim 12, wherein the substantially flat surface comprises a surface area sufficiently large enough to vertically stabilize the footer square apparatus when contacted with and pressed against a flat wall at the substantially flat surface.

14. The footer square apparatus of claim 12, further comprising a leveling device that can detect if the first guide line and second guide line are parallel with a construction surface.

15. The footer square apparatus of claim 12, wherein the corner marking comprises a post-receiving opening disposed through the footer square body that can receive a post.

16. A footer square apparatus for squaring a building foundation, the footer square apparatus comprising:
   a footer square body;
   a first guide line disposed on the footer square body and having a length that is substantially straight;
   a second guide line disposed on the footer square body and having a length that is substantially straight, wherein the length of the first guide line is substantially perpendicular to the length of the second guide line;
   a third guide line disposed on the footer square body and having a length that is substantially straight, wherein the length of the third guide line forms a 45° angle with the first guide line and forms a 45° angle with the second guideline;

at least one string receiving opening positioned on said first guide line, said second guide line, said third guideline, or any combination thereof;

a stabilizing edge comprising a substantially flat surface on an edge of the footer square body, wherein the first guide line is normal to the substantially flat surface and the second guide line is parallel to the substantially flat surface;

a corner marking; and at least one angle marking disposed on the footer square body, wherein the at least one angle marking identifies an angle as measured between a line from the corner marking to the angle marking and at least one of the first guide line, the second guide line, and the third guide line.

17. The footer square apparatus of claim 16, further comprising a leveling device that can detect if the first guide line and second guide line are parallel with a construction surface.

18. The footer square apparatus of claim 16, wherein the footer square body comprises a first leg, a second leg, and a connection arm in contact with the first leg and the second leg, wherein the first guide line is disposed on the first leg, the second guide line is disposed on the second leg, the third guide line is disposed on the connection arm, and the at least one angle marking is disposed on the connection arm.

19. The footer square apparatus of claim 16, wherein the footer square apparatus comprises a plurality of angle markings.

20. The footer square apparatus of claim 16, wherein the corner marking is located at an edge of the footer square body.

* * * * *